United States Patent [19]

Presswood

[11] 4,225,198
[45] Sep. 30, 1980

[54] BEARING MOUNT

[75] Inventor: Eiland K. Presswood, Fort Worth, Tex.

[73] Assignee: Textron, Inc., Providence, R.I.

[21] Appl. No.: 959,897

[22] Filed: Nov. 13, 1978

[51] Int. Cl.² ............................................. F16C 23/02
[52] U.S. Cl. ...................................... 308/37; 308/31; 308/66
[58] Field of Search ....................... 308/66, 68, 69, 70, 308/71, 32, 37, 31

[56] References Cited

U.S. PATENT DOCUMENTS

| | | | |
|---|---|---|---|
| 1,721,363 | 7/1929 | Wesp | 308/66 |
| 2,253,110 | 8/1941 | Cornell | 308/69 |
| 2,772,596 | 12/1956 | Trussell | 308/66 |

Primary Examiner—Lenard A. Footland
Attorney, Agent, or Firm—Richards, Harris & Medlock

[57] ABSTRACT

Accurate torque loading of a bearing (28) mounted in a cavity (34) of a housing (30) is achieved by rotation of an adjusting bolt (50). The bearing (28) is retained within the cavity (34) by means of a bearing race (32) that has one element (32a) engaging a positioning ring (40) and a second element (32b) in contact with a loading washer (44). In surface to surface contact with the loading washer (44) is a driver washer (46) that is positionable within the cavity (34) by means of the adjusting bolt (50). The driver washer (46) is in contact with a positioning ring (42) and by an inward adjustment of the driver washer into the cavity (34) the loading washer (44) is forced against the element (32b) to preload a torque on the bearing (28). Once a specified torque level has been achieved, the adjusting bolt (50) is locked in position by the lock nut (56).

7 Claims, 4 Drawing Figures

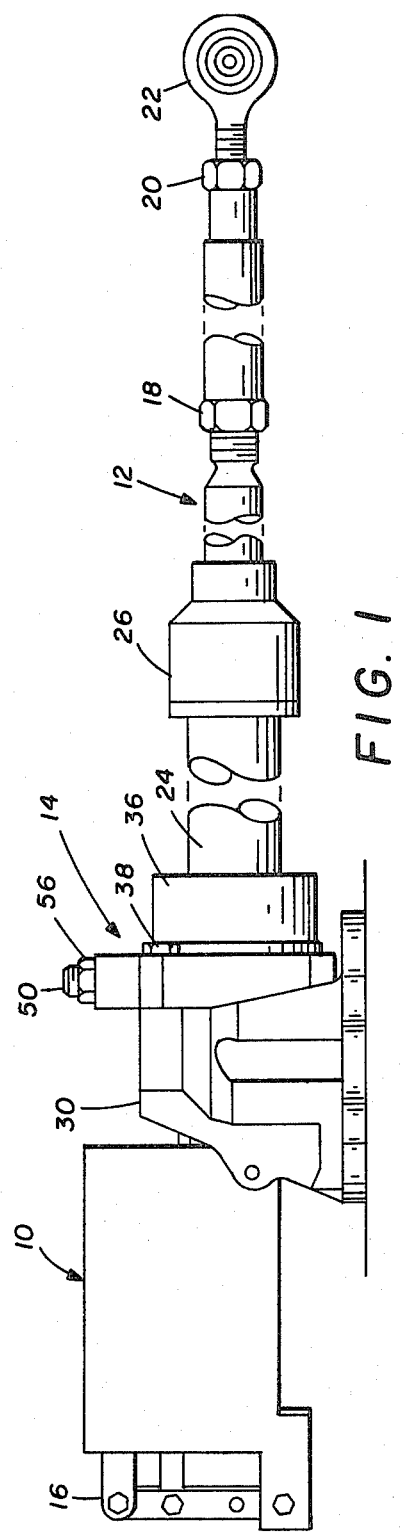
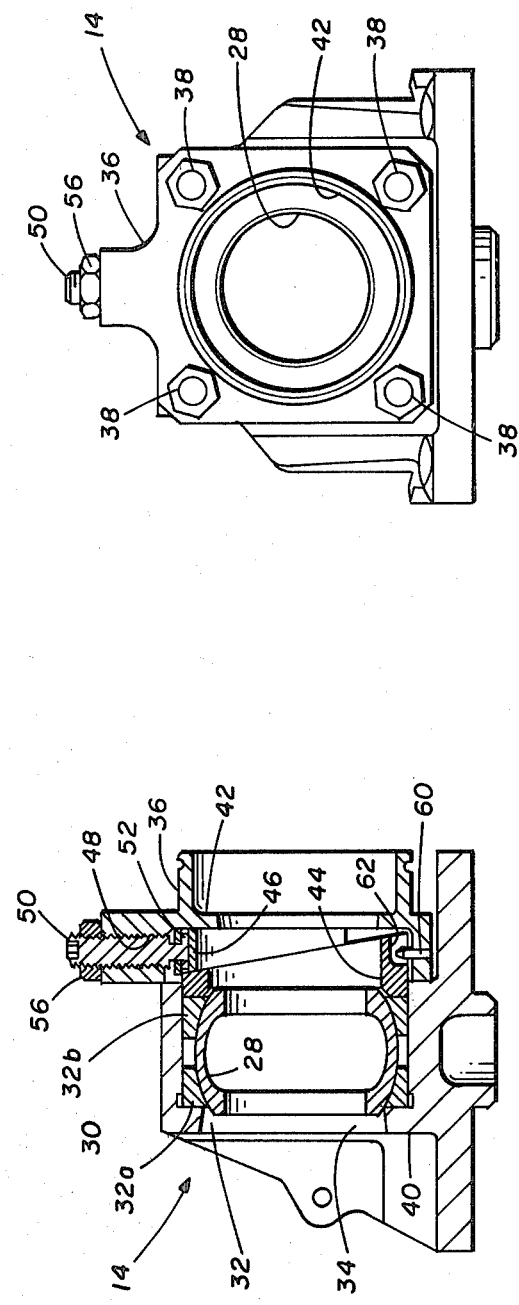

BEARING MOUNT

TECHNICAL FIELD

This invention relates to a bearing mount, and more particularly to apparatus for providing an infinite number of predetermined frictional torque values on a bearing mount by means of a single adjustment.

BACKGROUND ART

There are numerous applications where bearings that support either a rotating shaft or a translating shaft must be preloaded to minimize movement of the bearing in the supporting bearing race. Where the bearing is subjected to a transverse loading any movement of the bearing will cause excessive vibration of the shaft. In addition to increasing the wear on the shaft any vibration of the bearing will be transmitted to the bearing race and the supporting structure causing rapid damage and premature destruction of the bearing and supporting structure.

One example of an application where preloading of a bearing in a bearing race is required to minimize excessive wear is a linear actuator for helicopter controls. Any movement of the bearing supporting the actuator shaft produces a vibration in the shaft that is transmitted through the bearing to the supporting housing. For proper operation of such actuators it is required to periodically adjust preloading on the bearings to ensure a tight fitting assembly.

Heretofore, the adjustment of a bearing and supporting structure was a time consuming trial and error procedure. One technique found in the prior art utilized apparatus incorporating shims that were assembled into the supporting structure on a trial and error basis until proper preloading of the bearing was accomplished. This was a time consuming operation and in the example of the helicopter application described above meant removal of the helicopter from operation during the servicing procedure. In the application on helicopters where the bearing torque requires periodic adjustment the amount of operating time lost for servicing of a helicopter becomes excessive.

Another presently available method of adjusting preloading on a bearing utilizes a threaded lock nut that applied a force to the bearing race in a direction generally parallel to the longitudinal axis of the bearing. Such apparatus, is difficult to accurately preset and even more difficult to hold in a desired preloaded condition due to the lock nut relieving the adjustment nut preload. Therefore, again there is a trail-and-error situation between the torque nut and the lock nut.

DISCLOSURE OF INVENTION

In accordance with the present invention, there is provided apparatus having a single adjustment for quickly and accurately preloading the torque on a bearing in supporting structure. The adjustment applies a force in a direction transverse of the longitudinal axis of the bearing to accurately adjust preloading on the bearing by means of mating caming surfaces. The caming surfaces form an angular relationship with respect to the longitudinal axis of the bearing to enable accurate preloading of a bearing to a preestablished torque level.

In accordance with the present invention, apparatus for preloading a bearing includes a bearing race supporting the bearing to maintain the longitudinal axis thereof in a selected position. A force is applied to the bearing race in a direction generally parallel to the longitudinal axis of the bearing and having a magnitude to achieve the desired preloading. Adjustment of the loading of the bearing race is achieved by generating a force in a direction generally perpendicular to the longitudinal axis of the bearing to position the bearing race with respect to the bearing.

With the apparatus for preloading a bearing as described above, a bearing may be preloaded accurately by a single application within the descrete levels desired without disassembly of the total structure.

BRIEF DESCRIPTION OF DRAWINGS

A more complete understanding of the invention and its advantages will be apparent from the specification and claims and from the accompanying drawings illustrative of the invention.

Referring to the drawings:

FIG. 1 is a side view of a linear actuator, partially cut away, wherein the actuator and translating shaft are supported in a bearing preloaded by apparatus of the present invention;

FIG. 2 is a sectional view through the bearing and bearing support of FIG. 1 showing the arrangement of elements for preloading a bearing;

FIG. 3 is an end view looking toward the left in FIG. 1 showing the bearing housing.

DETAILED DESCRIPTION

Figure 4:
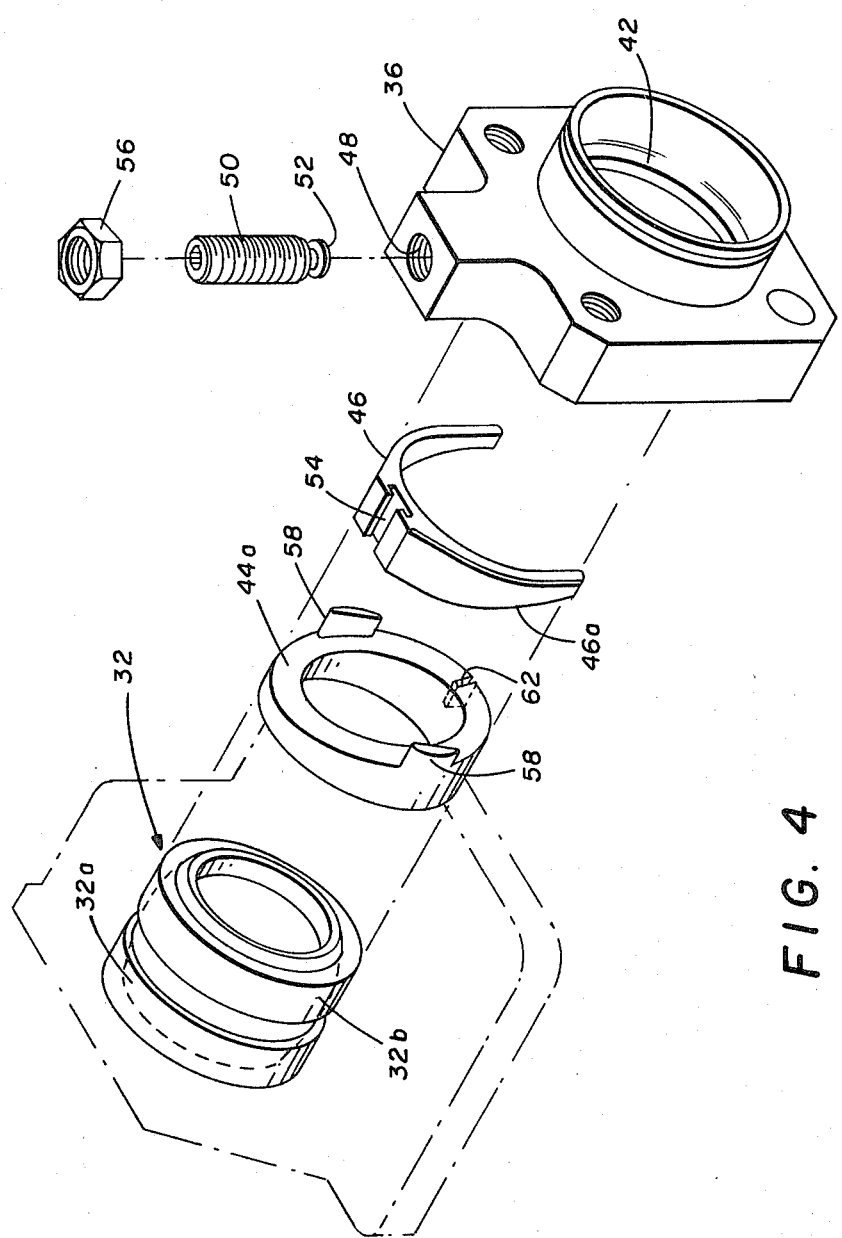
FIG. 4 is an exploded view of a preferred embodiment of apparatus for preloading a bearing in accordance with the present invention.

Referring to FIG. 1, there is shown a linear actuator 10 having an output connection to a translating tube linkage assembly 12 and supported by bearing structure 514. The actuator 10 may be of conventional design including a hydraulically actuated piston that is positionable by means of a mechanical input connected to linkage 16. An output of the actuator 10 is a linear motion that drives the tube assembly 12 which also may be of conventional design including adjustable sections 18 and 20 and terminating at a rod end 22. The output shaft 24 of the actuator 10 is illustrated as a connecting rod terminating at a coupling 26. The output shaft 24 has a translating motion in a bearing supported in the bearing structure 14. Because of the rapid movement and magnitude of forces involved in operation of the structure of FIG. 1, for resonably long life operation it is required that the output shaft 24 be securely mounted within the bearing structure 14.

Referring to FIGS. 2–4, details of the bearing structure 14 will now be described with particular emphasis on the apparatus for preloading a bearing supporting the output shaft 24. Supporting the output shaft 24 is a bearing 28 supported in a housing 30 by means of a bearing race 32 comprising a first generally ring shaped element 32a and a second generally ring shaped element 32b. The bearing race 32 positions the bearing 28 within a cavity 34 of the housing 30 wherein the cavity is defined at one end by an opening within the housing and at the opposite end by an opening within a retainer 36 attached to the housing by means of fasteners 38. Formed integral with the walls of the housing 30 at the left end thereof is a positioning ring 40 which functions as a stop for the ring element 32a of the bearing race 32. A similar positioning ring 42 is formed in the retainer 36 and it is between the positioning rings 40 and 42 that a force is developed to pretorque the bearing 28 to properly support the output shaft 24.

To adjust the preloading on the bearing 28 within the cavity 34 of the housing 30, there is also assembled into the cavity a loading washer 44 juxtapositioned a driver washer 46. The loading washer 44 and the driver washer 46 are in surface engaging contact between the camming surface 44a of the loading washer and the camming surface 46a of the driver washer. With respect to a longitudinal axis through the bearing 28, the surface 44a forms an angle of about 10° with respect to a line passing perpendicular to the longitudinal axis. The angle of the surface 46a of the driver washer 46 with respect to the longitudinal axis of the bearing 28 is similar to that of the surface 44a. It should be understood that an angle of 10° for camming surfaces 44a and 46a is not critical, but has been found to provide a good working relationship between the loading washer 44 and the driver washer 46 for accurate preloading adjustment.

When the loading washer 44 and the driver washer 46 are assembled into the cavity 34, the loading washer is in engaging contact with the ring shaped element 32b and the driver washer is in contact with the positioning ring 42. Thus, by forcing the driver washer downward into the cavity 34, the position of the loading washer 44 and consequently of the bearing race 32 is adjustable with respect to the bearing 28.

As best illustrated in FIG. 4, to retain the orientation of the loading washer 44 with respect to the driver washer 46 there is provided on the loading washer positioning lugs 58 that are spaced apart such that the downward extending members of the U-shaped driver washer fit between the lugs 58. To orient the loading washer 44 in the cavity 34, a dowel pin 60 extends upwardly into the cavity 34 and into an orientation slot 62 cut into the loading washer. Thus, by means of the lugs 58, the dowel pin 60 and the orientation slot 62 the correct relationship of the angled surfaces of the loading washer 44 and the driver washer 46 is maintained. Further, the relationship of the loading washer and driver washer with respect to the housing 30 is also maintained.

To adjust the movement of the driver washer 46 into the cavity 34 the retainer 36 includes a threaded opening 48 into which is assembled an adjusting bolt 50. The washer engaging end of bolt 50 terminates in a flat disc shaped head 52 that rotates in a channel 54 at the top end of the driver washer 46. Thus, by turning the adusting bolt 50 in the threaded opening 48 the inward position of the driver washer 46 into the cavity 34 may be adjusted. To retain a preselected inward position for the driver washer 46 a lock nut 56 is provided on the adjusting bolt 50.

Operation of the apparatus of FIGS. 2-4 to preload the torque on the bearing 28 is as explained previously. The ring shaped element 32a is held in position by means of the positioning ring 40 and the ring shaped element 32b is positioned by means of inward movement of the driver washer 46 against the loading washer 44. Turning the adjusting bolt 50 forces the driver washer 46 against the fixed positioning ring 42 thereby forcing the loading washer 44 against the ring shaped element 32b. The amount of torque loading on the bearing 28 is therefore accurately and simply controlled by means of one adjustment, that is, rotation of the adjusting bolt 50.

While only one embodiment of the invention, together with modifications thereof, has been described in detail herein and shown in the accompanying drawings, it will be evident that various further modifications are possible without departing from the scope of the invention.

I claim:

1. Apparatus for preloading a bearing having a longitudinal axis, comprising:
   a housing having an inner cavity for receiving the bearing;
   a bearing race for supporting the bearing in the cavity of said housing:
   loading means in contact with the bearing race in the cavity of said housing to preset the force applied to the bearing;
   a retainer attached to said housing as an enclosure for the cavity and to position said loading means therein, said retainer including a passage therethrough extending into the cavity;
   threaded adjustment means assembled into the passage and engaging said loading means to apply a force against said loading means in a direction transverse to the longitudinal axis of said bearing for positioning said bearing race via the loading washer; and
   wherein said loading means includes a wedged loading washer in contact with said bearing race and a wedged driver washer in contact with said retainer; and
   wherein said retainer includes means for orienting said loading washer in the cavity of said housing.

2. Apparatus for preloading a bearing as set forth in claim 1 wherein said loading washer includes positioning lugs engaging said driver washer to orient the driver washer with respect to the loading washer.

3. Apparatus for preloading a bearing as set forth in claim 1 wherein said threaded adjustment means includes an adjusting bolt assembled through the passage and engaging said driver washer to force the driver washer between said retainer and said loading washer.

4. Apparatus for preloading a bearing having a longitudinal axis, comprising:
   a housing having a cavity for receiving the bearing;
   a bearing race for supporting the bearing in the cavity of said housing;
   a wedged loading washer means in the cavity of said housing having one surface in contact with said bearing race and having a camming surface;
   wedged driver washer means having a camming surface engaging the camming surface of said loading washer;
   a retainer attached to said housing to form one end of the cavity and to position said loading washer and said driver means therein, said retainer including a passage therethrough extending into said cavity;
   threaded adjustment means assembled into the passage and engaging said driver means to apply a force against the driver means in a direction transverse to the longitudinal axis of the bearing for positioning said bearing race through said loading washer; and
   wherein said retainer includes means for orienting said loading washer in the cavity of said housing.

5. Apparatus for preloading a bearing set forth in claim 4 wherein said loading washer means includes positioning lugs engaging said driver means to orient said means with respect to said loading washer.

6. Apparatus for preloading a bearing as set forth in claim 4 wherein the camming surface of said loading washer means forms an angle with respect to the longitudinal axis that is less than 90°.

7. Apparatus for preloading a bearing as set forth in claim 6 wherein the caming surface of said driver washer means forms an angle with respect to the longitudinal axis so as to mate with the caming surface of said loading washer.

* * * * *